United States Patent
Tsao et al.

(10) Patent No.: US 6,525,849 B1
(45) Date of Patent: Feb. 25, 2003

(54) PROBE OF TWO-WAY OPTICAL COMPONENT NETWORK ANALYZER

(75) Inventors: Shyh-Lin Tsao, Taipei Hsien (TW); Tai-Chi Liu, Taoyuan Hsien (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/493,860

(22) Filed: Jan. 28, 2000

(51) Int. Cl.[7] .......................... H04B 10/08; H04B 10/22
(52) U.S. Cl. ....................... 359/110; 359/152
(58) Field of Search ................. 359/110, 152, 359/153, 154

(56) References Cited

U.S. PATENT DOCUMENTS

| | | | | |
|---|---|---|---|---|
| 5,982,791 A | * | 11/1999 | Sorin et al. | 359/247 |
| 6,188,509 B1 | * | 2/2001 | Lee et al. | 359/124 |
| 6,330,098 B1 | * | 12/2001 | Gopalakrishnan | 359/124 |

FOREIGN PATENT DOCUMENTS

JP P2000-216458 * 8/2000

* cited by examiner

Primary Examiner—Leslie Pascal
(74) Attorney, Agent, or Firm—J.C. Patents (57) ABSTRACT

A probe of two-way optical component network analyzer. The probe includes an electrical circulator, an optical transmitter, an optical receiver, and an optical circulator. The electrical circulator is connected to a network analyzer, an optical transmitter and an optical receiver respectively. Electrical signals from the network analyzer are sent to the optical transmitter via the electrical circulator. The electrical circulator is capable of picking up electrical signals from the optical receiver and transmitting the electrical signals back to the network analyzer. Since electrical signals from different devices are separated inside the electrical circulator, electrical interference is prevented. The optical circular is coupled to the optical element, the optical transmitter and the optical receiver respectively. The optical circulator directs optical signals from the optical transmitter to the optical element and transfer optical signals from the optical element to the optical receiver. Since optical signals from different source are de-coupled inside the optical circulator, optical interference is prevented. The optical transmitter is a device for converting electrical signals to optical signals, and the optical receiver is a device for converting optical signals back to electrical signals.

35 Claims, 8 Drawing Sheets

PROBE OF TWO-WAY OPTICAL COMPONENT NETWORK ANALYZER

BACKGROUND OF THE INVENTION

1. Field of Invention

The present invention relates to a network probe. More particularly, the present invention relates to a probe of two-way optical component network analyzer.

2. Description of Related Art

In general, a conventional microwave network analyzer is capable of measuring the S-parameters, the reflection coefficients, the transmission coefficients and the frequency responses of a component. Hewlett Packard has extended application of the analyzer to measuring the S-parameters of optical-electronic elements such as light transmitters and light receivers. However, the analyzer is only capable of unidirectional measurement of the S-parameters. Although unidirectional measurement of S-parameters is sufficient for measuring light transmitters or light receivers, measurement of optical elements such as fiber ring loop resonator or fiber grating becomes very inconvenient. In order to measure all four S-parameters of a two-port optical element, the analyzer needs to be dismantled after a measurement in a first direction and reassembled for a second measurement in the opposite direction.

Since the design of an optical system depends on obtaining correct optical parameters, precise measurement of optical parameters in both directions is very important.

In 1985, Donald R. Bowling et al has proposed a multi-channel instrument for measuring dispersion parameters in U.S. Pat. No. 4,497,030. The measuring instrument is actually the combination of a power distributor with an automatic network analyzer produced by Hewlett Packard (HP8409A). The instrument utilizes a co-axial exchange network to adjust the radio frequency (RF) when different channels are selectively measured. Although the method in that invention is not included in the scope of this invention, they can be combined to form a bi-directional measuring instrument for the parameters of a multi-port optical element.

In 1997, Atsushi Ishihara has proposed a method of synchronizing network measurement element in U.S. Pat. No. 5,646,536. The object of the invention is to provide a method of synchronizing multi-channel bi-directional measurement. However, externally mounted measuring probe or something similar to the bi-directional optical probe of this invention is excluded.

In 1994, Paul S. Weiss and Stephan J. Stranick has proposed a method of sending testing signals from a microwave sweep oscillator to a test sample in U.S. Pat. No. 5,281,814. Signals reflecting from the test sample are delivered to a network analyzer, and then the signals are analyzed to obtain a frequency response. Frequency adjustment is controlled by the microwave sweep oscillator. The invention is a new type of probe that enables a network analyzer to improve the resolution of a scanning tunnel microscope. Yet, the probe has a function, structure and application entirely different from the bidirectional probe proposed in this invention.

In 1990, David Curtls and Elizabeth E. Ames has proposed a method of obtaining the dispersion parameters of an optical element through a vector network analyzer in "Trans-action on Microwave Theory and Techniques", IEEE vol. 38, issue 5, pg. 552~559. The network analyzer sends out an electrical signal to an optical transmitter, and then the optical transmitter emits an optical signal to a test element. Response signals from the test element are transferred to an optical receiver. Optical signals to the optical receiver are converted back to electrical signals and sent to the network analyzer to obtain the S-parameters. The main drawback of the method is the use of directional coupler. To measure the optical parameters in the opposite direction, the optical element must be remounted leading to possible alignment errors.

SUMMARY OF THE INVENTION

Accordingly, one object of the present invention is to provide a bi-directional measuring probe and method of measurement capable of eliminating human errors.

A second object of this invention is to provide the probe of a bi-directional analyzer for measuring the S-parameters of an optical component or network element. All the optical parameters needed are obtained in a single setting without the need to rotate the optical element. In addition, the resulting parameters are more accurate.

The testing system for measuring optical parameters includes a HP network analyzer and the specially designed bidirectional probe of this invention. Using the testing system, testing time is shortened because there is no need to reset the optical element again in the opposite direction. In addition, accurate readings for the optical parameters are obtained because human errors due to resetting are prevented.

One major aspect of the testing system is its bi-directionality of measurement. The system is capable of obtaining the frequency response of S-parameters of an optical element at various frequencies quickly. Moreover, the probe of this invention can be easily incorporated with various microwave network-analyzing instruments in the market for obtaining optical parameters $S_{11}$, $S_{12}$, $S_{21}$ and $S_{22}$.

To achieve these and other advantages and in accordance with the purpose of the invention, as embodied and broadly described herein, the invention provides a bi-directional probe for analyzing an optical component or network. The probe includes an electrical circulator, an optical transmitter, an optical receiver, and an optical circulator. The electrical circulator is connected to the optical transmitter by an electrical cable. The electrical circulator transmits incoming electrical signals from the network analyzer to the optical transmitter where the electrical signals are converted to optical signals and directed to the optical element to be tested. The optical receiver picks up return signals from the optical element and converts the optical signals into electrical signals. The electrical signals from the optical receiver pass through the electrical circulator and return to the network analyzer. Through the electrical circulator, incoming and outgoing electrical signal follows separate pathways so that unnecessary electrical interference is avoided. The optical transmitter is connected to the optical circulator by an optical fiber. The optical transmitter converts electrical signals into optical signals and then directs the optical signals to the optical circulator. The optical transmitter also picks up incoming optical signals and converts the optical signals into electrical signals. The electrical signals from the optical transmitters are transmitted to the optical circulator. The optical circulator is connected to the optical receiver by an optical fiber. The optical circulator is capable of separating incoming light wave from reflected light wave without optical interference so that forward light signals are directed to the optical element while reflected light signals are returned to the optical receiver. The optical receiver is connected to the electrical circulator by an electrical cable. The reflected optical signals are converted into electrical signals by the optical receiver, and then the electrical signals are transmitted back to the network analyzer via the electrical cable and the electrical circulator.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
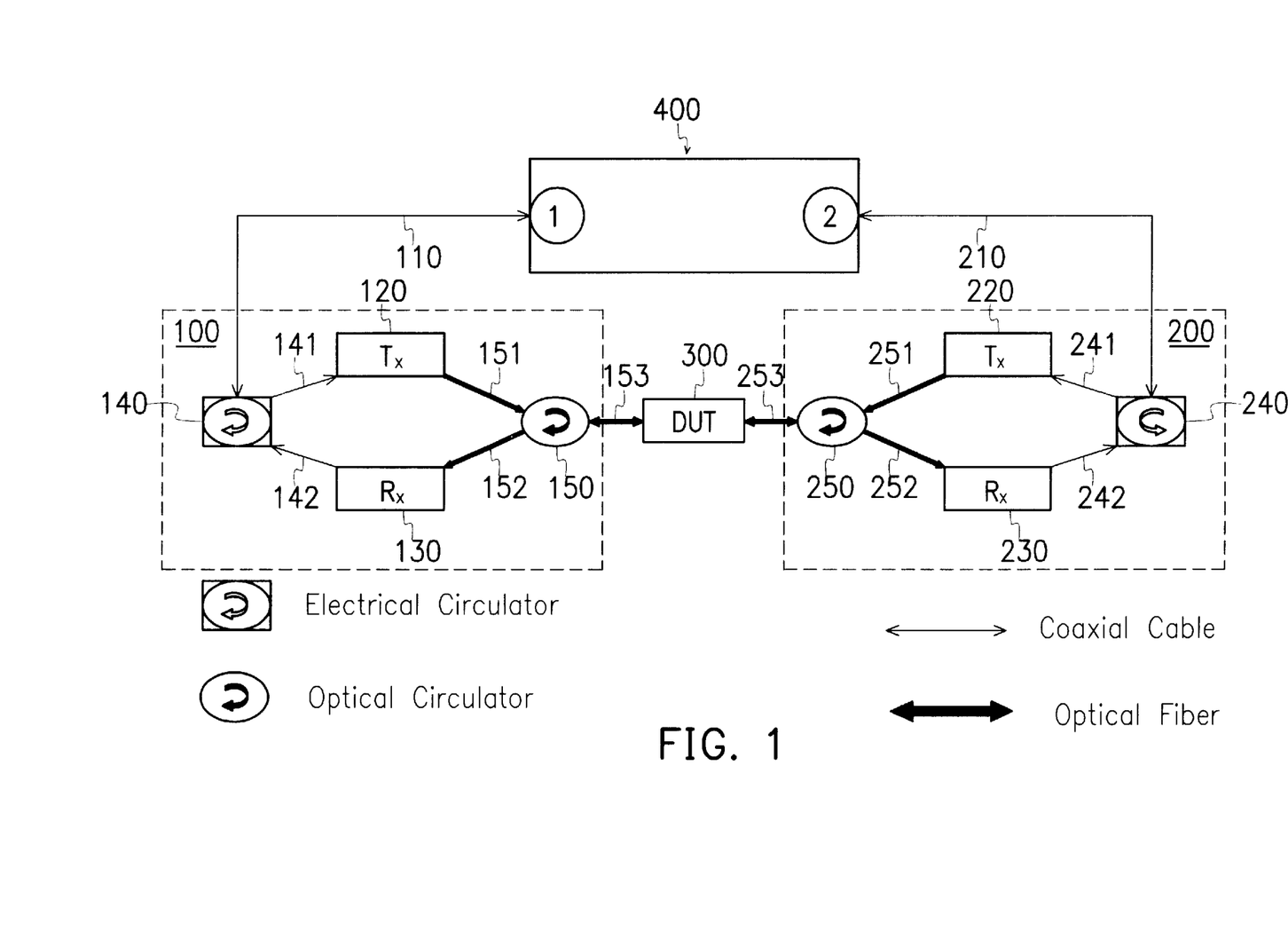
FIG. 1 is a schematic diagram showing two bidirectional probes linked to a network analyzer for obtaining the S-parameters of an optical component according to this invention.

FIG. 1 is a schematic diagram showing two bi-directional probes linked to a network analyzer for obtaining the S-parameters of an optical element according to this invention. As shown in FIG. 1, the bi-directional optical network analyzing system includes two sets of bidirectional probes 100 and 200. The first set of bi-directional probe includes an electrical circulator 140, an optical circulator 150, an optical transmitter 120 and an optical receiver 130. Similarly, the second set of bi-directional probe includes an electrical circulator 240, an optical circulator 250, an optical transmitter 220 and an optical receiver 230.

The electrical circulators 140 and 240 in this invention is a device for receiving first electrical signals from the network analyzer 400 and transmitting the first electrical signals to the optical transmitters 120 and 220 respectively. In the optical transmitters 120 and 220, the first electrical signals are converted into first optical signals. The first optical signals are re-directed to the optical device under test (DUT) 300 to be tested. The optical device under test (DUT) 300 returns third optical signals to the optical receivers 130 and 230. The optical receivers 130 and 230 covert the third optical signals into third electrical signals. The third electrical signals pass through the electrical circulators 140 and 240 respectively and finally return to the network analyzer 400. Incoming and outgoing electrical signals are prevented from electrical interference inside the electrical circulators 140 and 240.

The optical circulators 150 and 250 are capable of separating incoming light wave from reflected light wave. Hence, forward optical signals are passed to the optical device under test (DUT) 300 while reflected signals from the optical element are returned to the optical receivers 130 and 230 respectively. The forward optical signals and the reflected optical signals are prevented from interfering with each other inside the optical circulators 150 and 250.

The optical transmitters 120 and 220 are devices for converting incoming electrical signals into optical signals. On the contrary, the optical receivers 130 and 230 are devices for converting incoming optical signals into electrical signals.

To measure the frequency response of parameter $S_{21}$ of the optical device under test (DUT) 300, testing signals are transmitted from the input/output port (1) of the network analyzer 400 to the first bidirectional probe 100. Electrical signals from the network analyzer are carried along an electrical cable 110 to the electrical circulator 140. First electrical signals are then sent via an electrical cable 141 to the optical transmitter 120. After the conversion of first electrical signals to first optical signals in the optical transmitter 120, the first optical signals are sent to the optical circulator 150 via an optic cable 151. The first optical signals are transmitted to the optical device under test (DUT) 300 via an optic fiber 153. The first optical signals are transformed into second optical signals after passing through the optical device under test (DUT) 300. The second optical signals from the optical device under test (DUT) 300 are forwarded to the second bidirectional probe 200. Similarly, the second optical signals are forwarded to the optical circulator 250 via an optic fiber 253. The second optical signals are then transmitted to the optical receiver 230 via an optic fiber 252. The second optical signals are converted into second electrical signals in the optical receiver 230. The second electrical signals are transmitted to the electrical circulator 240 via an electrical cable 242. The second electrical signals are next returned to the input/output port (2) of the network analyzer 400 through another electrical cable 210. Once electrical signals are returned to the network analyzer 400, necessary computation can be carried out to display the frequency response curve of parameter $S_{21}$ for that particular optical device under test (DUT) 300.

To measure the frequency response of parameter $S_{12}$ of the optical device under test (DUT) 300, the testing signals are transmitted in reverse. In other words, testing signals are transmitted from the input/output port (2) of network analyzer 400 to the second bidirectional probe 200. Electrical signals from the network analyzer are carried along the electrical cable 210 to the electrical circulator 240. First electrical signals are then sent via an electrical cable 241 to the optical transmitter 220. After the conversion of first electrical signals to first optical signals in the optical transmitter 220, the first optical signals are sent to the optical circulator 250 via an optic cable 251. The first optical signals are next transmitted to the optical device under test (DUT) 300 via the optic fiber 253. The first optical signals are transformed into second optical signals after passing through the optical device under test (DUT) 300. The second optical signals from optical device under test (DUT) 300 are forwarded to the first bi-directional probe 100. Similarly, the second optical signals are forwarded to the optical circulator 150 via the optic fiber 153. The second optical signals are then transmitted to the optical receiver 130 via an optic fiber 152. The second optical signals are converted into second electrical signals in the optical receiver 130. The second electrical signals are transmitted to the electrical circulator 140 via an electrical cable 142. The second electrical signals are next returned to the input/output port (1) of the network analyzer 400 through the electrical cable 110. Once electrical signals are returned to the network analyzer 400, necessary computation can be carried out to display the frequency response curve of parameter $S_{12}$ for that particular optical device under test (DUT) 300.

To measure the frequency response of parameter $S_{11}$ of the optical device under test (DUT) 300, testing signals are transmitted from the input/output port (1) of the network analyzer 400 to the first bidirectional probe 100. Electrical signals from the network analyzer 400 are carried along the electrical cable 110 to the electrical circulator 140. First electrical signals are then sent via the electrical cable 141 to the optical transmitter 120. After the conversion of first electrical signals to first optical signals in the optical transmitter 120, the first optical signals are sent to the optical circulator 150 via the optic cable 151. The first optical signals are next transmitted to the optical device under test (DUT) 300 via the optic fiber 153. A portion of the first optical signals is reflected back from the optical device under test (DUT) 300. The reflected optical signals from the optical device under test (DUT) 300 returns to the first bidirectional probe 100. Similarly, the reflected optical signals are forwarded to the optical circulator 150 via the optic fiber 153 and then transmitted to the optical receiver 130 via the optic fiber 152. The reflected optical signals are converted into second electrical signals in the optical receiver 130. The second electrical signals are transmitted to the electrical circulator 140 via the electrical cable 142. The second electrical signals are next returned to the input/output port (1) of the network analyzer 400 through the electrical cable 110. Once electrical signals are returned to the network analyzer 400, necessary computation can be carried out to display the frequency response curve of parameter $S_{11}$ for that particular optical device under test (DUT) 300.

To measure the frequency response of parameter $S_{22}$ of the optical device under test (DUT) 300, testing signals are transmitted from the input/output port (2) of the network analyzer 400 to the second bi-directional probe 200. Electrical signals from the network analyzer 400 are carried along the electrical cable 210 to the electrical circulator 240. First electrical signals are then sent via the electrical cable 241 to the optical transmitter 220. After the conversion of first electrical signals to first optical signals in the optical transmitter 220, the first optical signals are sent to the optical circulator 250 via the optic cable 251. The first optical signals are next transmitted to the optical device under test (DUT) 300 via the optic fiber 253. A portion of the first optical signals is reflected from the optical device under test (DUT) 300. The reflected optical signals from the optical device under test (DUT) 300 returns to the second bi-directional probe 200. Similarly, the reflected optical signals are forwarded to the optical circulator 250 via the optic fiber 253 and then transmitted to the optical receiver 230 via the optic fiber 252. The reflected optical signals are converted into second electrical signals in the optical receiver 230. The second electrical signals are transmitted to the electrical circulator 240 via the electrical cable 242. The second electrical signals are next returned to the input/output port (2) of the network analyzer 400 through the electrical cable 210. Once electrical signals are returned to the network analyzer 400, necessary computation can be carried out to display the frequency response curve of parameter $S_{22}$ for that particular optical device under test (DUT) 300.

One important aspect of the probes of this invention is that the forward signals from the first or the second input/output port will not interfere with the backward signals to either of them. Hence, the probes can be conveniently used in bi-directional measurement of optical network parameters of an optical element.

Figure 2:
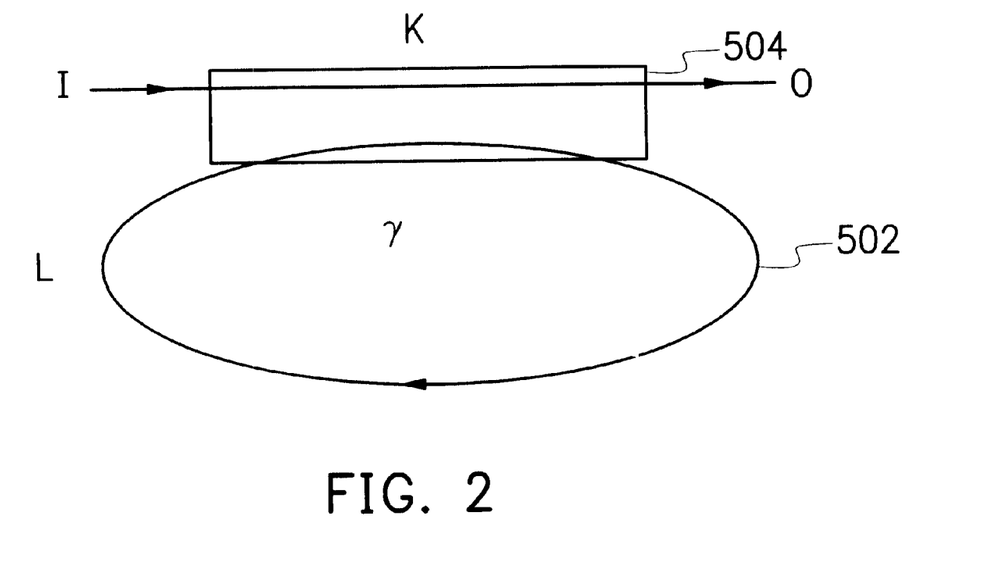
FIG. 2 is a schematic diagram of a fiber-optic notch filter.

In the embodiment of this invention in FIG. 1, two probes connected to a network analyzer are arranged to measure the S-parameters of an optical element. FIG. 2 is a schematic diagram of a circular fiber-optic filter. In the following description, the circular fiber-optic filter is use as an example of an optical element whose S-parameters are required. As shown in FIG. 2, the filter comprises of a two-by-two optical coupler 504 and a fiber section 502. The coupling coefficient of the optical coupler 504 is represented by K, the intrinsic loss of the optical coupler 504 is represented by γ, L is the fiber loop length, I and O represent the input and output signals, respectively. The circular fiber-optic filter is actually an optical coupler whose input port is joined to its output port to form a loop. The following is a description of frequency response measurements for obtaining the S-parameters $S_{21}$ and $S_{12}$ of a fiber-optic notch filter.

Figure 3:
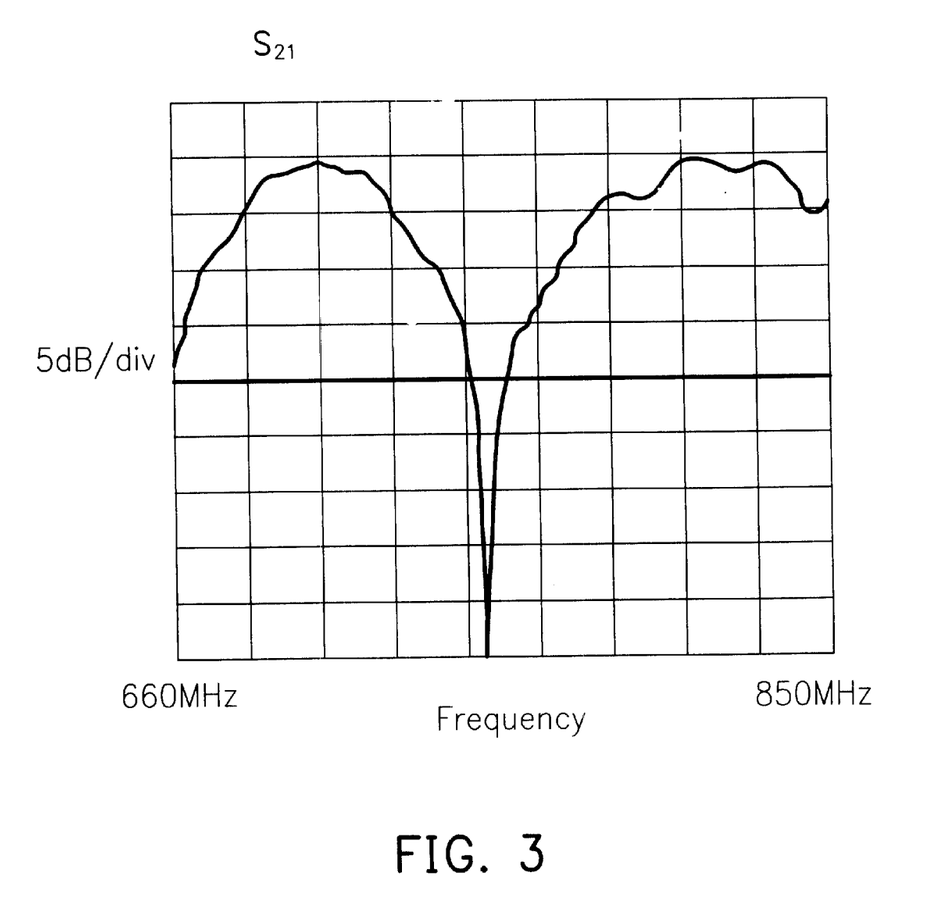
FIG. 3 is a plot of the frequency response of parameter $S_{21}$ of a fiber-optic notch filter.

To obtain the frequency response curve of parameter $S_{21}$ testing signals are sent from the input/output port (1) of the network analyzer 400 via the electrical cable 110 to the electrical circulator 140. The electrical signals are sent to the optical transmitter 120 via the electrical cable 141. After the conversion of electrical signals to optical signals in the optical transmitter 120, the optical signals are transmitted to the optical circulator 150 via the optical cable 151. The optical signals are directed at the optical device under test (DUT) 300, in this case the circular fiber-optic filter. Light wave signals that penetrate the optical device under test (DUT) 300 are captured by the optical cable 253 and channeled to the optical circulator 250. The transmitted optical signals are sent to the optical receiver 230 via the optic fiber 252. After the conversion of optical signals to electrical signals in the optical receiver 230, the electrical signals are transmitted to the electrical circulator 240 via the electrical cable 242. The electrical signals are next transmitted from the electrical circulator 240 to the input/output port (2) of the network analyzer 400 through the electrical cable 210. Once the electrical signals are returned to the network analyzer 400, necessary calculations for obtaining the frequency response of the circular fiber-optic filter can be executed and then displayed. FIG. 3 is a plot of the frequency response of parameter $S_{21}$ of a fiber-optic notch filter.

Figure 4:
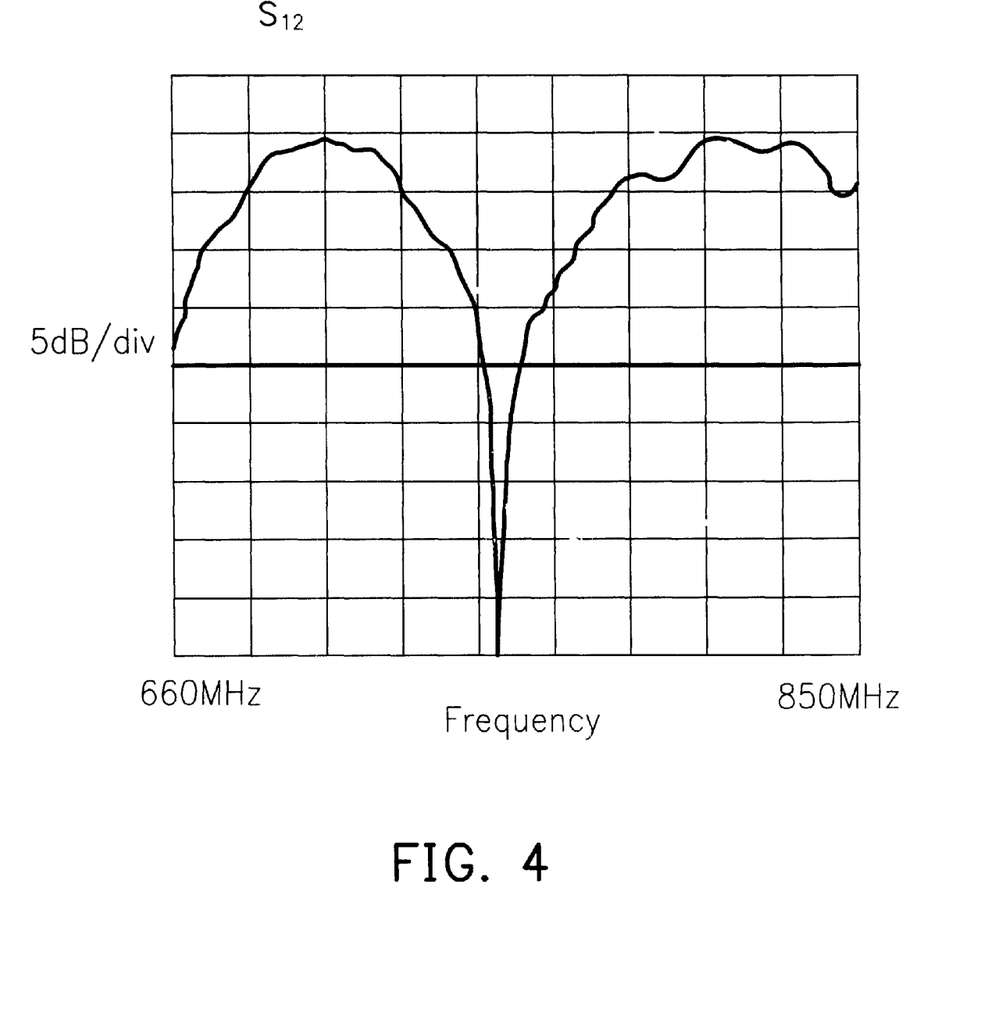
FIG. 4 is a plot of the frequency response of parameter $S_{12}$ of a fiber-optic notch filter.

Similarly, to obtain the frequency response curve of parameter $S_{12}$, testing signals are sent from the input/output port (2) of the network analyzer 400 via the electrical cable 210 to the electrical circulator 240. The electrical signals are sent to the optical transmitter 220 via the electrical cable 241. After the conversion of electrical signals to optical signals in the optical transmitter 220, the optical signals are transmitted to the optical circulator 250 via the optical cable 251. The optical signals are directed at the optical device under test (DUT) 300, in this case the circular fiber-optic filter. Light wave signals that penetrate the optical device under test (DUT) 300 are captured by the optical cable 153 and channeled to the optical circulator 150. The transmitted optical signals are sent to the optical receiver 130 via the optic fiber 152. After the conversion of optical signals to electrical signals in the optical receiver 130, the electrical signals are transmitted to the electrical circulator 140 via the electrical cable 142. The electrical signals are next transmitted from the electrical circulator 140 to the input/output port (1) of the network analyzer 400 through the electrical cable 110. Once the electrical signals are returned to the network analyzer 400, necessary calculations for obtaining the frequency response of the circular fiber-optic filter can be executed and then displayed. FIG. 4 is a plot of the frequency response of parameter $S_{12}$ of a fiber-optic notch filter.

To obtain a better understanding of the frequency response characteristic of a tested optical element, the S-parameters $S_{21}$ and $S_{12}$ of an optical element such as the circular fiber-optic filter is modeled according to Z-transform theory.

Figure 5:
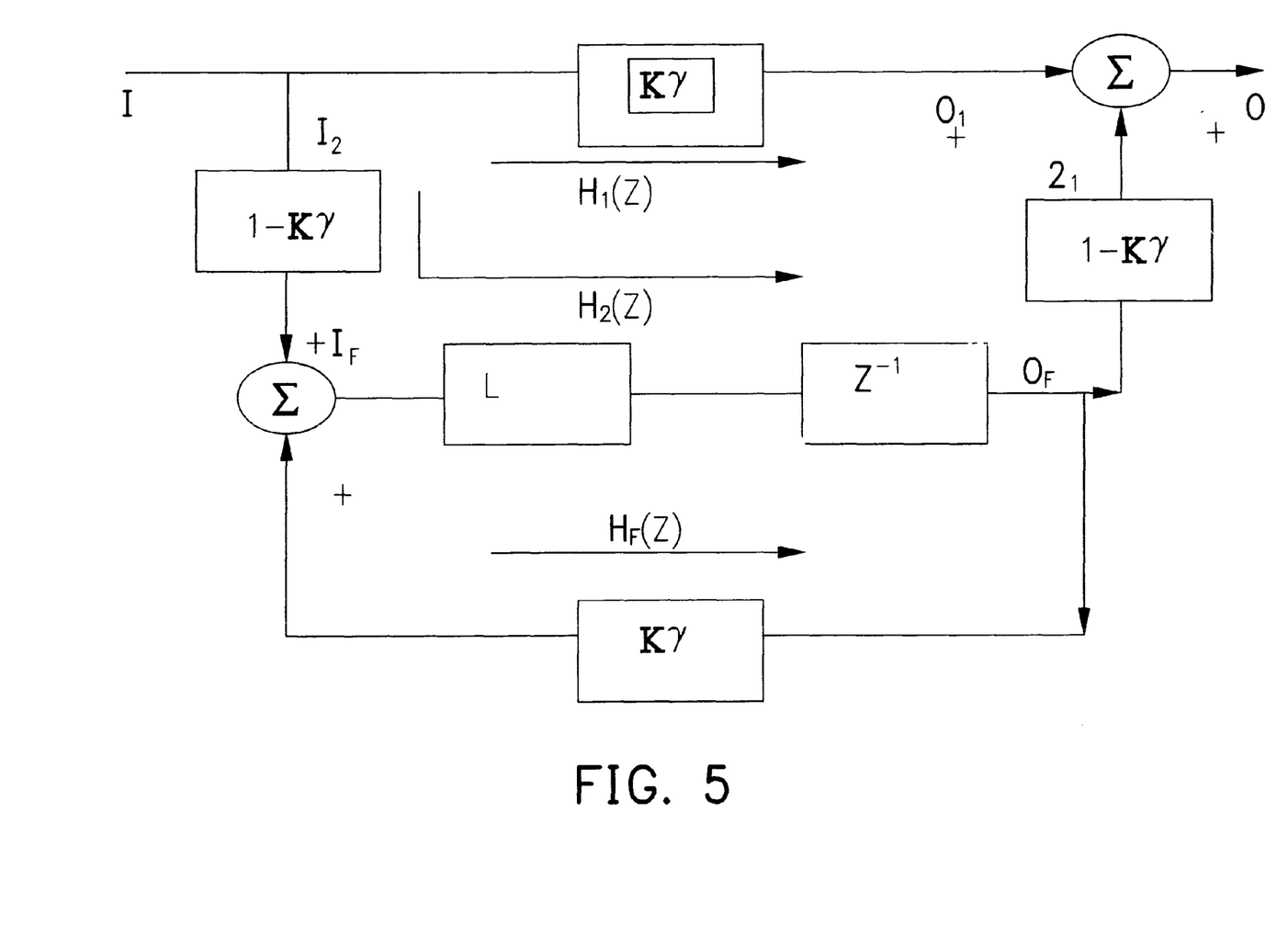
FIG. 5 is a block diagram showing the flow of control signals inside a fiber-optic notch filter.

FIG. 5 is a block diagram showing the signal flow chart of a fiber-optic notch filter. As shown in FIG. 5, output signals from the filter are the sum of the respective optical signals coming from two routes. One is from the previous output $H_1(z)$ while the other is from the current input $H_2(z)$.

The transfer function of the first route 610 is $H_1(z)$, where $$H_1(z) = O_1/I_1; \quad (1)$$
$$= K\gamma$$

the secondary feedback transfer function is $H_F(z)$, where $H_F(z)$ is given by $$H_F(Z)=O_F/I_F=(LZ^{-1})/(1-LKZ^{-1}\gamma) \quad (2);$$

the transfer function of the second route 620 is $H_2(z)$, where $H_2(z)$ is given by $$H_2(Z)=O_2/I_2=(1-K\gamma)^2 H_F(Z)=[(1-K\gamma)^2 LZ^{-1}]/(1-LKZ^{-1}\gamma) \quad (3);$$

if I is the input and O is the output, the overall transfer function is H(z), where H(z) is given by $$H(z) = O/I = H_1(z) + H_2(z) = K\gamma + [(1 - K\gamma)^2 LZ^{-1}]/(1 - LKZ^{-1}\gamma) = \quad (4)$$
$$K\gamma + [(1 - 2K\gamma)LZ^{-1}]/(1 - LKZ^{-1}\gamma) =$$
$$K\gamma[Z - (1 - 2K\gamma)L/K\gamma]/(Z - LK\gamma).$$

Figure 6:
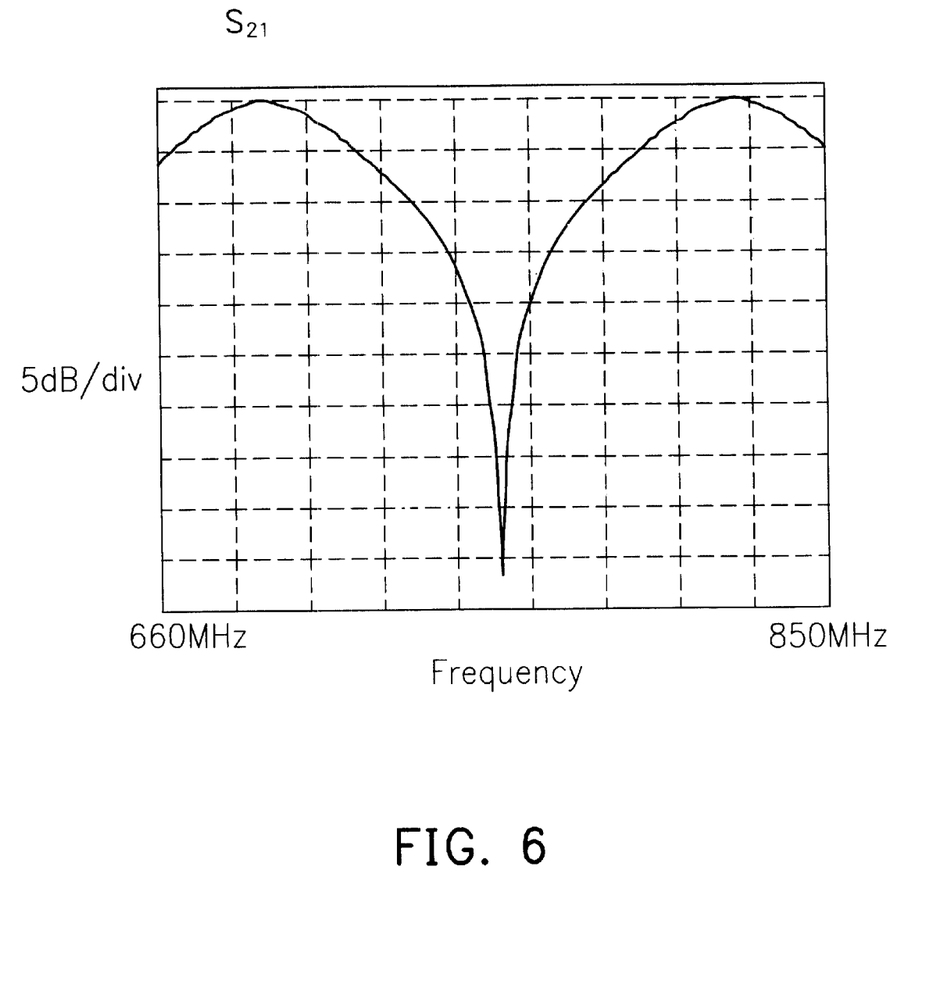
FIG. 6 is a simulated frequency response curve of parameter $S_{21}$ of a fiber-optic notch filter.
Figure 7:
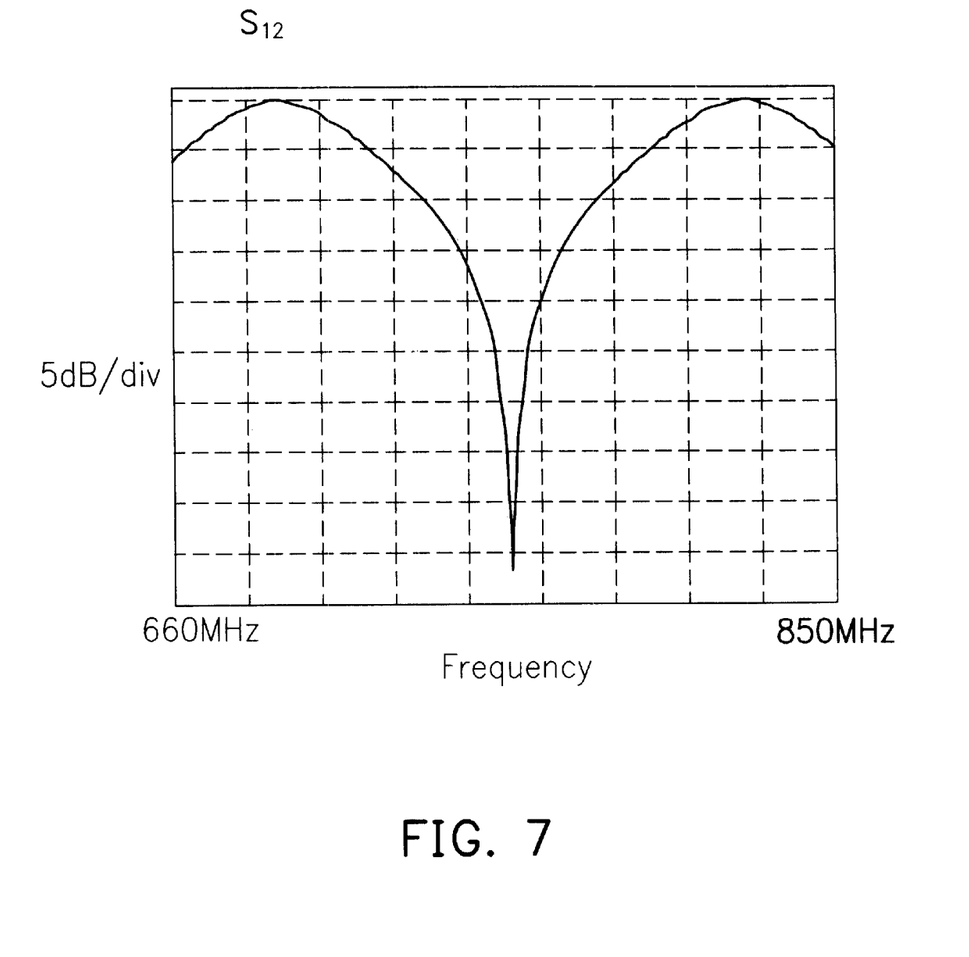
FIG. 7 is a simulated frequency response curve of parameter $S_{12}$ of a fiber-optic notch filter.

FIG. 6 is a simulated frequency response curve of parameter $S_{21}$ of a circular fiber-optic filter; and FIG. 7 is a simulated frequency response curve of parameter $S_{12}$ of a circular fiber-optic filter. In the embodiment of this invention, the value of K is 0.9, L is 154 cm and γ is 0.85. Note that the frequency response curves in FIGS. 6 and 7 are very similar in shape to the ones in FIGS. 3 and 4 respectively.

Figure 8:
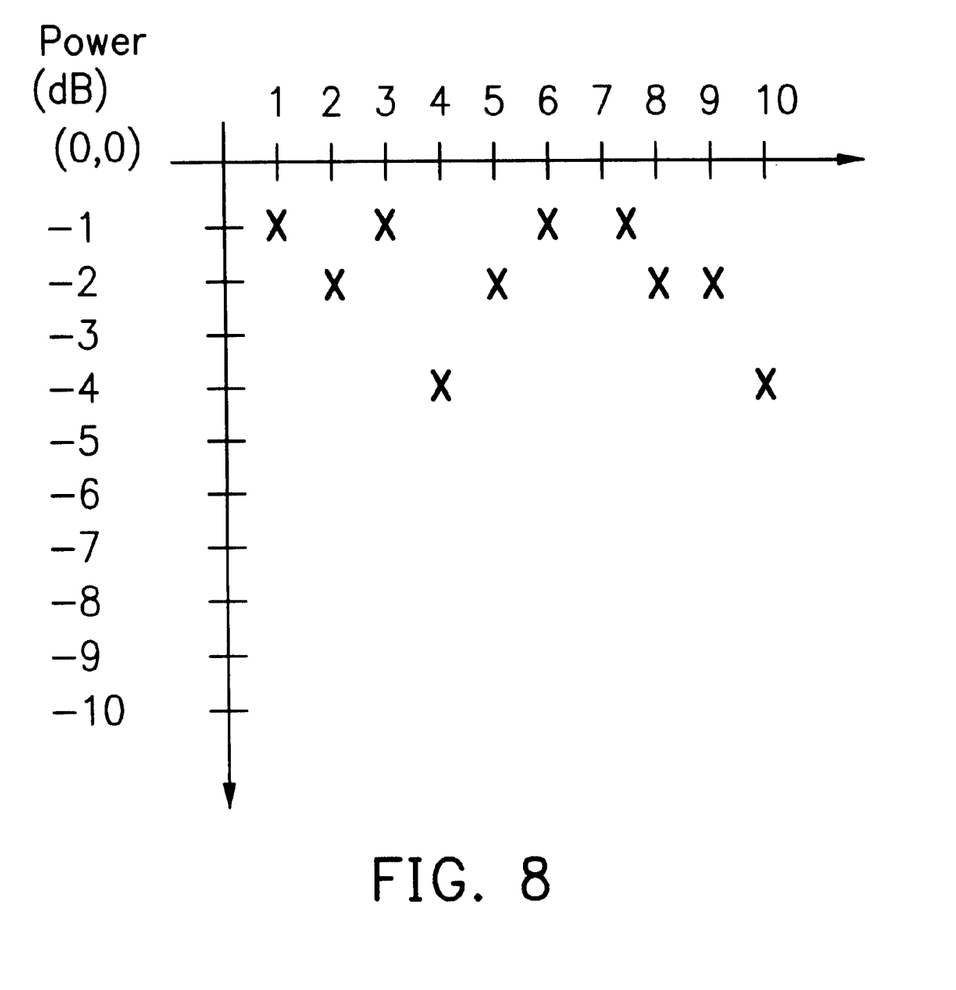
FIG. 8 is a plot of power rating versus measurement for the fiber-optic notch filter.

In addition, parameters $S_{21}$ and $S_{12}$ are also measured by a conventional setup using the single frequency power rating of a notch filter according to this invention as a testing point. The resulting plot of power rating versus measurement for a notch filter after 10 measurements is shown in FIG. 8. The resulting plot indicates that measurements can be affected by manual reversal of the optical element. Using the bi-directional probes of this, manual reversal of optical element is no longer necessary. Hence, errors in measurement are greatly reduced.

In summary, by controlling testing signals to the electrical circulators and the optical circulators used in the probes, optical signals are able to pass through an optical element from both directions. Therefore, a network analyzer can determine all the S-parameters of the optical element simultaneously. Moreover, human errors due to the reversal of optical element are prevented because the probes can function in the forward and the reverse direction.

The system can be applied as a transmitter or a receiver in bi-directional HFC CATV networks.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A probe of two-way optical component network analyzer, comprising:

an electrical circulator electrically connected to an input/output port of a network analyzer;

an optical transmitter electrically connected to the electrical circulator;

an optical receiver electrically connected to the electrical circulator; and an optical circulator optically coupled to the optical transmitter, the optical receiver and the optical element to be analyzed respectively, wherein first electrical signals are transmitted from the input/output port of the network analyzer to the electrical circulator, the first electrical signals are next transmitted to the optical transmitter, the first electrical signals are converted into first optical signals by the optical transmitter, the first optical signals are channeled to the optical element via the optical circulator, the first optical signals are transformed into second optical signals after passing through the optical element, the second optical signals are transmitted to the optical receiver via the optical circulator, the second optical signals are converted into second electrical signals by the optical receiver, the second electrical signals are transmitted to the electrical circulator, and finally the second electrical signals are returned to the input/output port.

2. The probe of claim 1, wherein the probe also includes an electrical cable for connecting the input/output port of the network analyzer to the electrical circulator.

3. The probe of claim 1, wherein the probe also includes a first electrical cable for connecting the electrical circulator and the optical transmitter.

4. The probe of claim 1, wherein the probe also includes a second electrical cable for connecting the electrical circulator and the optical receiver.

5. The probe of claim 1, wherein the probe also includes a first optical cable for coupling the optical circulator and the optical receiver.

6. The probe of claim 1, wherein the probe also includes a second optical cable for coupling the optical circulator and the optical transmitter.

7. The probe of claim 1, wherein the probe also includes a third optical cable for coupling the optical circulator and the optical element.

8. The system of claim 1, wherein the system can be applied as a transmitter or a receiver in bi-directional HFC CATV networks.

9. A bi-directional probe for analyzing an optical element, comprising:

a first electrical circulator electrically connected to a first input/output port of a network analyzer;

a first optical transmitter electrically connected to the first electrical circulator;

a first optical receiver electrically connected to the first electrical circulator;

a first optical circulator optically coupled to the first optical receiver, the first optical transmitter and one end of an optical element to be tested;

a second electrical circulator electrically connected to a second input/output port of the network analyzer;

a second optical transmitter electrically connected to the second electrical circulator;

a second optical receiver electrically connected to the second electrical circulator; and a second optical circulator optically coupled to the second optical receiver, the second optical transmitter and the opposite end of the optical element, wherein first electrical signals are transmitted from the first input/output port of the network analyzer to the first electrical circulator, the first electrical signals are next transmitted to the first optical transmitter, the first electrical signals are converted into first optical signals by the first optical transmitter, the first optical signals are channeled to the optical element via the first optical circulator, second optical signals are produced after the first optical signals are directed to the optical element, the second optical signals are transmitted to the second optical receiver via the second optical circulator, the second optical signals are converted into second electrical signals by the second optical receiver, the second electrical signals are transmitted to the second electrical circulator, the second electrical signals are transmitted to the second input/output port, on the other hand, a portion of the first optical signals is reflected back from the optical element to form reflected optical signals, the reflected optical signals are transmitted to the first optical receiver via the first optical circulator, the reflected optical signals are converted into third electrical signals by the first optical receiver, the third electrical signals are sent to the first electrical circulator and finally returned to the first input/output port.

10. The probe of claim 9, wherein the probe also includes a second electrical cable for connecting the first electrical circulator and the first optical transmitter.

11. The probe of claim 9, wherein the probe also includes a third electrical cable for connecting the first electrical circulator and the first optical receiver.

12. The probe of claim 9, wherein the probe also includes a first optical cable for coupling the first optical circulator and the first optical receiver.

13. The probe of claim 9, wherein the probe also includes a second optical cable for coupling the first optical circulator and the first optical transmitter.

14. The probe of claim 9, wherein the probe also includes a third optical cable for coupling the first optical circulator and the optical element.

15. The probe of claim 9, wherein the probe also includes a fourth electrical cable for connecting the second input/output port of the network analyzer and the second electrical circulator.

16. The probe of claim 9, wherein the probe also includes a fifth electrical cable for connecting the second electrical circulator and the second optical transmitter.

17. The probe of claim 9, wherein the probe also includes a sixth electrical cable for connecting the second electrical circulator and the second optical receiver.

18. The probe of claim 9, wherein the probe also includes a fourth optical cable for coupling the second optical circulator and the second optical receiver.

19. The probe of claim 9, wherein the probe also includes a fifth optical cable for coupling the second optical circulator and the second optical transmitter.

20. The probe of claim 9, wherein the probe also includes a sixth optical cable for coupling the second optical circulator and the optical element.

21. The probe of claim 9, wherein the probe also includes a first electrical cable for connecting the first input/output port of the network analyzer and the first electrical circulator.

22. A bi-directional optical element analyzing system, comprising:

a network analyzer having a first input/output port and a second input/output port;

a first electrical circulator electrically connected to the first input/output port;

a first optical transmitter electrically connected to the first electrical circulator;

a first optical receiver electrically connected to the first electrical circulator;

a first optical circulator optically coupled to the first optical receiver, the first optical transmitter and one end of an optical element to be tested;

a second electrical circulator electrically connected to the second input/output port;

a second optical transmitter electrically connected to the second electrical circulator;

a second optical receiver electrically connected to the second electrical circulator; and a second optical circulator optically coupled to the second optical receiver, the second optical transmitter and the opposite end of the optical element, wherein first electrical signals are transmitted from the first input/output port to the first electrical circulator, the first electrical signals are next transmitted to the first optical transmitter, the first electrical signals are converted into first optical signals by the first optical transmitter, the first optical signals are channeled to the optical element via the first optical circulator, second optical signals and reflected optical signals are produced after the first optical signals are directed to the optical element, the second optical signals are transmitted to the second optical receiver via the second optical circulator, the second optical signals are converted into second electrical signals by the second optical receiver, the second electrical signals are transmitted to the second electrical circulator and then transmitted to the second input/output port, on the other hand, the reflected optical signals are transmitted to the first optical receiver via the first optical circulator, the reflected optical signals are converted into third electrical signals by the first optical receiver, the third electrical signals are sent to the first electrical circulator and finally returned to the first input/output port.

23. The system of claim 22, wherein the system also includes a second electrical cable for connecting the first electrical circulator and the first optical transmitter.

24. The system of claim 22, wherein the system also includes a third electrical cable for connecting the first electrical circulator and the first optical receiver.

25. The system of claim 22, wherein the system also includes a first optical cable for coupling the first optical circulator and the first optical receiver.

26. The system of claim 22, wherein the system also includes a second optical cable for coupling the first optical circulator and the first optical transmitter.

27. The system of claim 22, wherein the system also includes a third optical cable for coupling the first optical circulator and the optical element.

28. The system of claim 22, wherein the system also includes a fourth electrical cable for connecting the second input/output port of the network analyzer and the second electrical circulator.

29. The system of claim 22, wherein the system also includes a fifth electrical cable for connecting the second electrical circulator and the second optical transmitter.

30. The system of claim 22, wherein the system also includes a sixth electrical cable for connecting the second electrical circulator and the second optical receiver.

31. The system of claim 22, wherein the system also includes a fourth optical cable for coupling the second optical circulator and the second optical receiver.

32. The system of claim 22, wherein the system also includes a fifth optical cable for coupling the second optical circulator and the second optical transmitter.

33. The system of claim 22, wherein the system also includes a sixth optical fiber for coupling the second optical circulator and the optical element.

34. The system of claim 22, wherein more than three of the electrical circulators and optical circulators can use for measuring the S parameters of multi-port optical elements.

35. The system of claim 22, wherein the system also includes a first electrical cable for connecting the first input/output port of the network analyzer and the first electrical circulator.

* * * * *